April 12, 1927.
B. W. DREYER
1,623,962
FOLDING SEAT FOR WINDOW CLEANING
Filed July 6, 1926
2 Sheets-Sheet 2
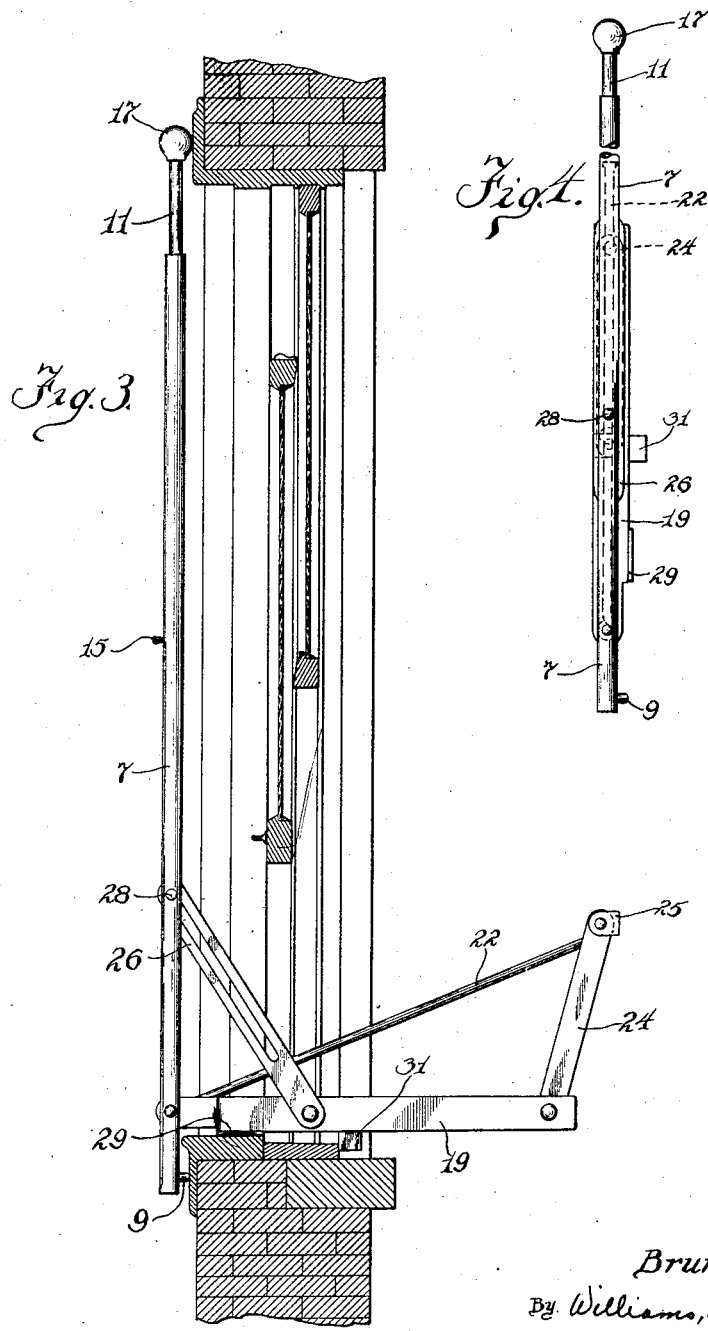

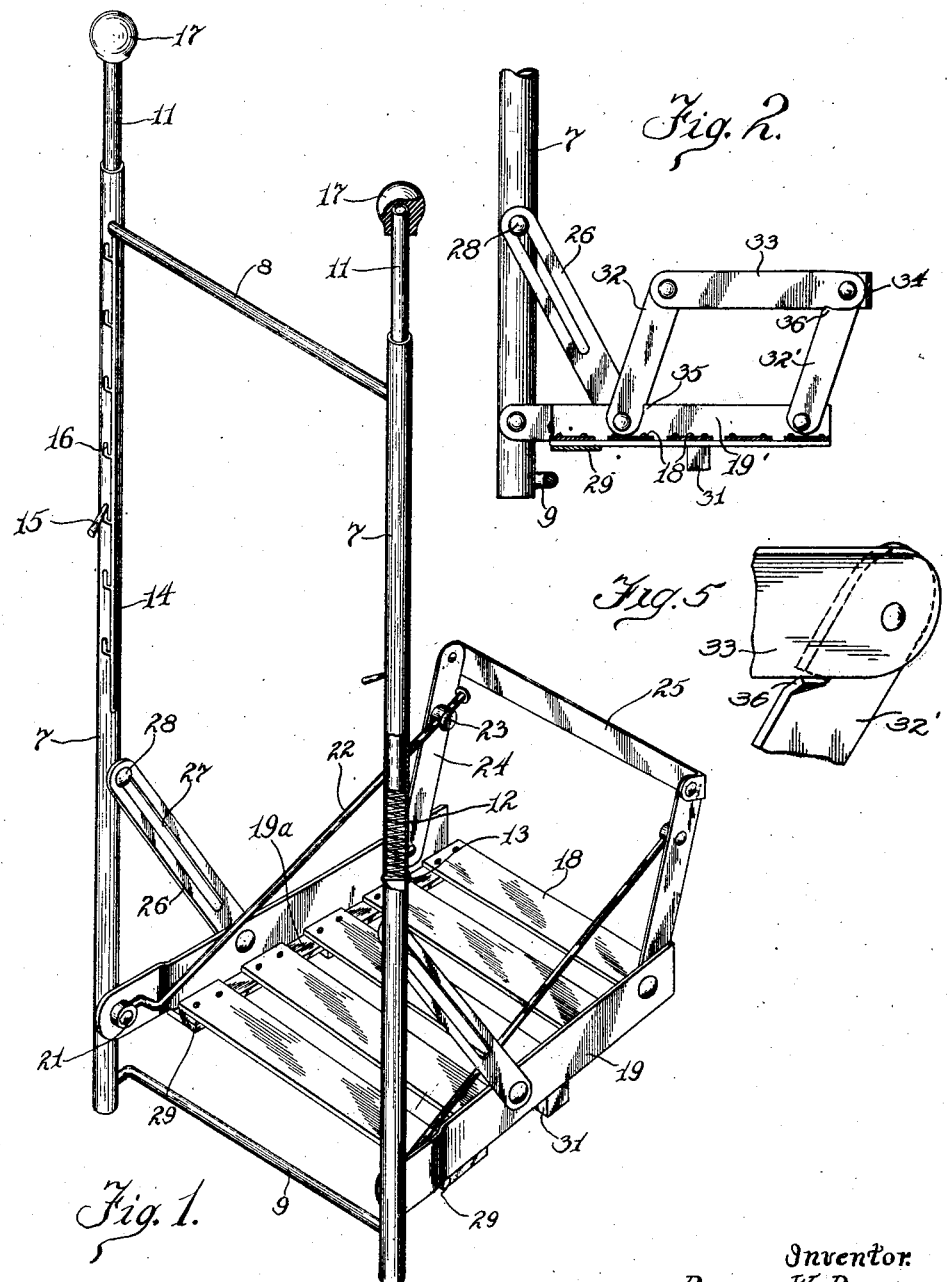

Patented Apr. 12, 1927.

1,623,962

UNITED STATES PATENT OFFICE.

BRUNO W. DREYER, OF CHICAGO, ILLINOIS.

FOLDING SEAT FOR WINDOW CLEANING.

Application filed July 6, 1926. Serial No. 120,559.

My invention relates to a seat or scaffolding adapted to be used by window washers, painters and others working on the outside of windows.

It is the object of my invention to provide an improved device of this type which is easily collapsible within a small compass, which is readily adjustable to fit windows of various sizes, which is light in weight so as to be readily portable, and which is of substantial construction so as to offer maximum safety to the user.

Other objects will appear from the following description, reference being had to the accompanying drawings in which:

Fig. 1 is a perspective view of the seat.

Fig. 2 is a sectional view of a modified seat construction.

Fig. 3 is a side elevation of the seat shown as used resting within a window frame, the latter being shown in section, and Fig. 4 is a side elevation of the seat in collapsed condition.

Fig. 5 is a perspective view of a pair of links showing the means for limiting their relative motion.

Various types of seats adapted to be used by window washers, painters and others having occasion to work on the outside of windows, have been proposed, but most of these rely on some kind of device by which the seat is clamped to the window frame. It is not only difficult to attach such devices, but they mar the window frame, take an appreciable amount of time to attach to the frame, and are relatively insecure. My invention contemplates the provision of a seat which is supported in position purely by the force of gravity and, therefore, can be readily placed in position and removed. In order to make the device practical for household use, I also have made provisions whereby the seat may be readily folded up so as to lie in the plane of the vertical supports and thus the device may be easily stored in a relatively small space. The device provides a seat upon the level of the window sill.

In Fig. 1 the device is shown as comprising a pair of vertical standards 7 connected at the top by a cross bar 8 and at the bottom by a rubber covered bar 9. The latter bar projects rearwardly from the vertical standards 7 and, as shown in Fig. 3, is adapted to abut against the inner vertical surface of the sill. The standards 7 are tubular, to form guides for rods 11 which are freely reciprocable therein. The rods are normally urged upwardly by compression coil springs 12 which are confined within the standards. The lower ends of the springs rest against pins 13 extending through the standards and the upper ends bear upon the lower ends of the rods 11. The standards are provided with longitudinal slots 14 to permit the passage of handles 15 which are secured in the rods 11. A plurality of L-shaped slots 16 communicating with the longitudinal slot 14 are provided to receive the handle 15 and thus permit the adjustment of the extension of the rods. The springs 12 maintain the handles 15 in the vertical portions of the L-shaped slots 16. The upper ends of the rods 11 are capped with rubber buffers 17 which, as apparent from Fig. 3, are adapted to rest against the upper cross piece of the window casing or against the wall above the frame. The seat comprises a plurality of boards 18 which rest upon and are secured to the horizontal flanges 19ª of the seat supports 19. These supports are pivotally secured to the respective standards 7 by pins 21, the pins 21 also serving as pivots for rods 22. The other ends of the rods 22 are slidable in swivel pins 23 which are rotatably secured to the back-rest uprights 24. The ends of the rods beyond the pins 23 have heads formed thereon to limit the extent of the movement of the pins 23. The lower ends of the uprights 24 are pivoted to the seat supports 19 and at their upper ends are joined by a back-rest 25. The seat is further connected to the standards by links 26 which are pivoted to the seat supports 19 and are provided with longitudinal slots 27 whereby the links are slidably secured to the standards by pins 28. Suitable rubber pads 29 may be fixed beneath the flange 19ª of the seat supports so as to prevent the window sill from being marred by contact with the seat. A pair of blocks 31 may also be secured to the flange 19ª to prevent the inward movement of the seat relative to the sill.

In Fig. 2 I have shown a modified seat construction in which the back-rest is supported by pairs of parallel links 32 and 32' which are pivotally joined to the seat support 19'. The upper ends of these links 32 and 32' are pivotally connected by links 33 which carry a back-rest 34. The clockwise (Fig. 2) movement of the links 32 and 32' relative to the seat supports 19′ is limited by lugs or ears 35 and 36 punched or struck from the support 19′ and link 32′ so as to lie in the planes of the links 32 and 33, respectively. In Fig. 5 the construction of the links 32′ and 33 is shown in detail, showing how the lug 36 limits the relative movement between these two links. The lug 35 is similar to lug 36 and limits the motion between the link 32 and the seat support 19′ in a similar manner. It will be apparent that the back-rest supporting linkage just described may be readily folded so as to lie within the plane of the side of the seat supports 19′, and that the seat support as a whole may be swung upwardly due to the pin and slot connection with the standards 7 so that the whole assembly will lie within the plane of the standards 7, thus forming a compact device which may be readily stored away.

In a similar manner the device shown in Figs. 1 and 3 may be readily folded together, the back-rest 25 and its uprights 24 being first folded so as to lie within the confines of the seat supports 19, the sliding and swivel connection between the uprights 24 and the rods 22 permitting such movement. Subsequently the seat as a whole may be swung upwardly on the pivots 21 so that all of the parts will lie within the plane of the standards 7. It will be apparent that in this latter operation the link 26 will slide relative to the pin 28 to permit such movement.

To condition the device for use, it is merely necessary to unfold the seat in the manner as will be obvious from the description of the method by which it is folded together. The height of the rods 11 may be adjusted to suit the length of the particular window frame with which the device is being used. In ordinary use in a home the windows will be of the same length so that the adjustment of these rods ordinarily will be unnecessary. It will be noted that all of the adjustments may be made before the seat is inserted in the window frame, and that use of the device will not disturb these adjustments. Having unfolded the seat in its extended position, as shown in Fig. 1, the device may be readily inserted within any window frame, the weight of the seat portions beyond the rubber pad 29 being sufficient to hold the device in the position as shown in Fig. 3. The rods 22 also serve as braces by which the user may aid in supporting himself while seating himself in the device. The user may also employ the device as a scaffold, standing upon the boards 18, thus enabling him to reach all of the parts of the outer portion of the window frame.

While I have shown specific embodiments of my invention, it will be apparent that slight changes may be made without departing from the general principles of my invention. I, therefore, do not wish to limit the scope of my invention to the specific constructions disclosed except as necessary by the claims which follow.

1. In a device of the class described, the combination of a pair of vertical spaced tubular standards, rods guided in said standards, resilient means tending to extend said rods from said standards, means for adjusting the length of the extension of said rods from said standards, and a seat pivotally mounted on said standards and adapted to be folded so as to lie between them.

2. In a device of the class described, the combination of a pair of rigidly connected spaced substantially parallel standards of adjustable length, a seat pivotally mounted on said standards, a pair of links pivotally connected to the sides of said seat and having pin and slot connections with said standards whereby the seat is adapted to be held in a horizontal position, and a back rest on said seat, said back rest being arranged to be folded so as to lie against said seat and said seat being arranged to be swung upwardly so as to lie between said standards.

3. In a device of the class described, the combination of a pair of rigidly connected tubular standards, spring pressed rods adjustably mounted in said standards, a seat pivotally connected to and between said standards, links forming a lost motion connection between said seat and said standards, and a back rest pivotally secured at the outer end of said seat, said back rest and seat being adapted to be folded within the compass of said standards.

4. In a device of the class described, the combination of a pair of rigidly connected tubular standards, spring pressed rods adjustably mounted in said standards, a seat pivotally connected to and between said standards, links forming a lost motion connection between said seat and said standards, a back rest pivotally secured at the outer end of said seat, said back rest and seat being adapted to be folded within the compass of said standards, and rods pivoted to said standards and being pivotally and slidably connected to said back rest.

5. In a device of the class described, the combination of a pair of rigidly connected vertical tubular standards, rods telescoped in said standards, manipulative means for adjustably securing said rods in a position extending from said standards, a seat pivoted to and between said standards, a lost motion linkage between said seat and said standards for supporting the former, a back rest pivoted at the outer extremity of said seat, and a rod pivotally and slidably connected to said back rest and rotatably secured between said standards whereby said back rest may be folded within the plane of said seat and said seat may be folded so as to lie in a position between said standards.

6. In a device of the class described, the combination of a pair of rigidly connected tubular standards, manually adjustable rods mounted in said standards, a seat pivotally connected to said standards, links forming a lost motion connection between said seat and said standards to limit the pivotal movement of said seat, a back rest pivotally secured to said seat, said back rest and said seat being adapted to be folded within the compass of said standards, and means to limit the pivotal movement of said back rest.

In witness whereof, I hereunto subscribe my name this 26th day of June, 1926.

BRUNO W. DREYER.